United States Patent [19]

Behle

[11] 4,326,557
[45] Apr. 27, 1982

[54] TOP OPERATED TANK CAR BOTTOM OUTLET VALVE ASSEMBLY INSTALLED FROM THE BOTTOM OF THE CAR

[75] Inventor: Gunter R. Behle, St. Peters, Mo.

[73] Assignee: ACF Industries, Incorporated, New York, N.Y.

[21] Appl. No.: 142,309

[22] Filed: Apr. 21, 1980

[51] Int. Cl.³ .............................................. F16K 31/50
[52] U.S. Cl. ..................................... 137/316; 251/144; 29/213 R
[58] Field of Search ............... 251/144; 137/316, 347, 137/350, 315, 15; 29/157.1 R, 213 R

[56] References Cited

U.S. PATENT DOCUMENTS

| | | | |
|---|---|---|---|
| 2,164,039 | 6/1939 | Meyer et al. | 251/144 |
| 2,190,723 | 2/1940 | McBride | 251/144 X |
| 2,442,953 | 6/1948 | Krone et al. | 251/144 X |
| 4,221,358 | 9/1980 | Basler et al. | 251/144 |

Primary Examiner—William R. Cline
Attorney, Agent, or Firm—Henry W. Cummings

[57] ABSTRACT

In accordance with the present invention, a tank car valve mounting flange, valve cage and valve seat are provided. The cage is generally cylindrical. The mounting flange extends radially outwardly from the cage. The valve seat is located on an inner surface of the cage. A multi-armed sleeve is threaded onto a threaded valve stem. Clamp fasteners attach a valve closure to a lower portion of the stem. The sub-assembly of the valve closure, valve stem and sleeve is placed within the valve cage, with the closure resting on the valve seat. The arms of the sleeve extend into cage slots having a generally horizontal portion in the cage. A keeper assembly is provided to retain the sleeve arms within the cage slots. The stem is then connected to a top operating rod extending to the top of the tank. The valve assembly is then raised by the top operating rod until the valve flange engages a tank mounting flange. Valve assembly fasteners are inserted through openings in the valve flange into the mounting flange to hold the assembly in place. An outlet chamber for loading and unloading of the lading is then attached to the valve seat mounting flange conveniently with outlet chamber fasteners located on the same bolt circle as the mounting flange fasteners and the valve assembly and outlet chamber are ready for operation. If desired the outlet chamber need only be attached at the loading site and at destination.

25 Claims, 9 Drawing Figures

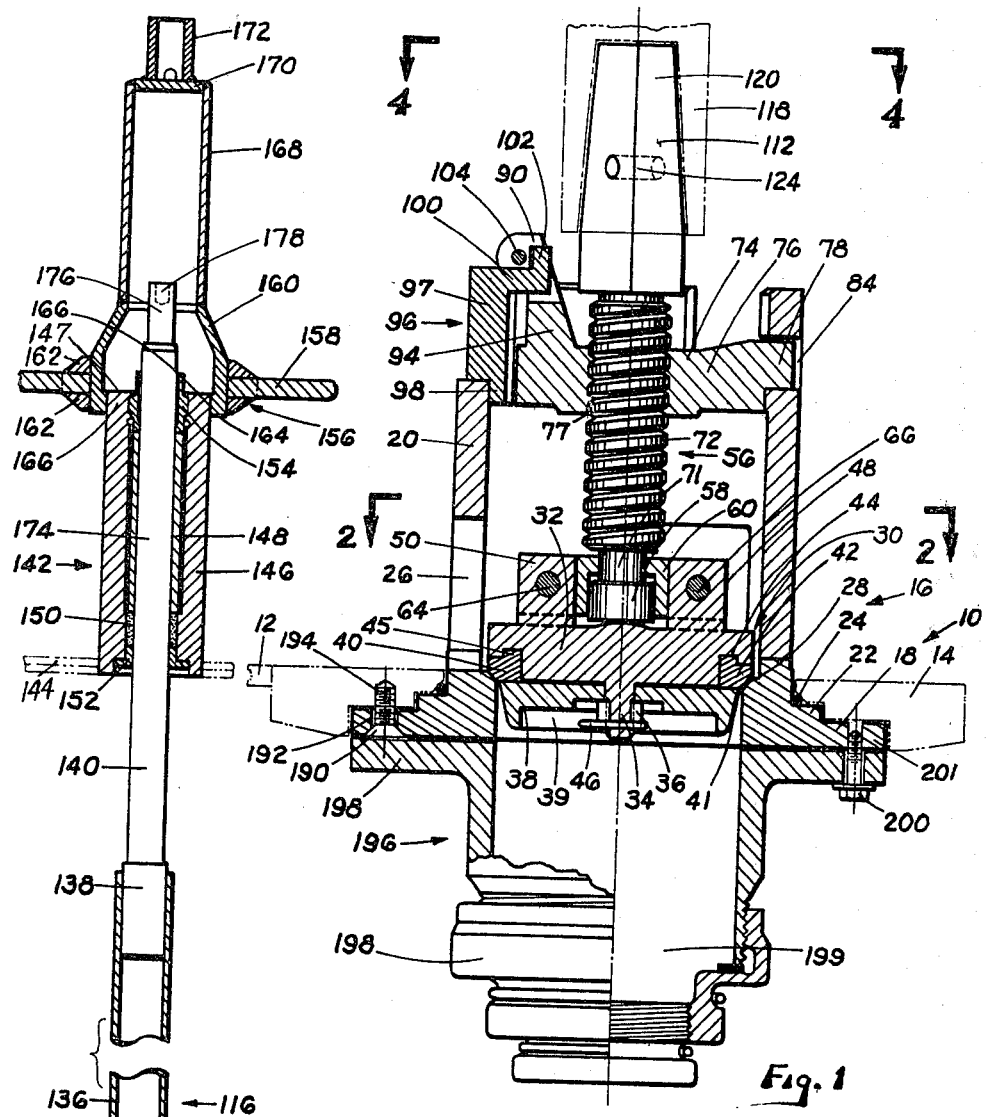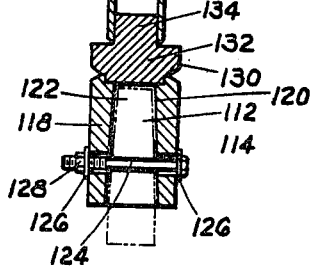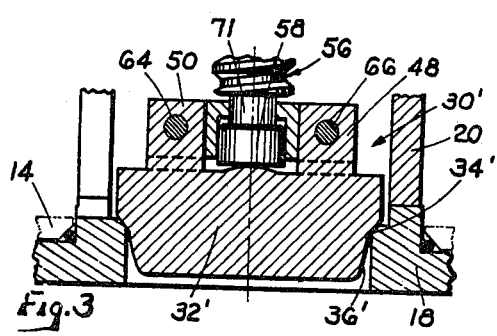

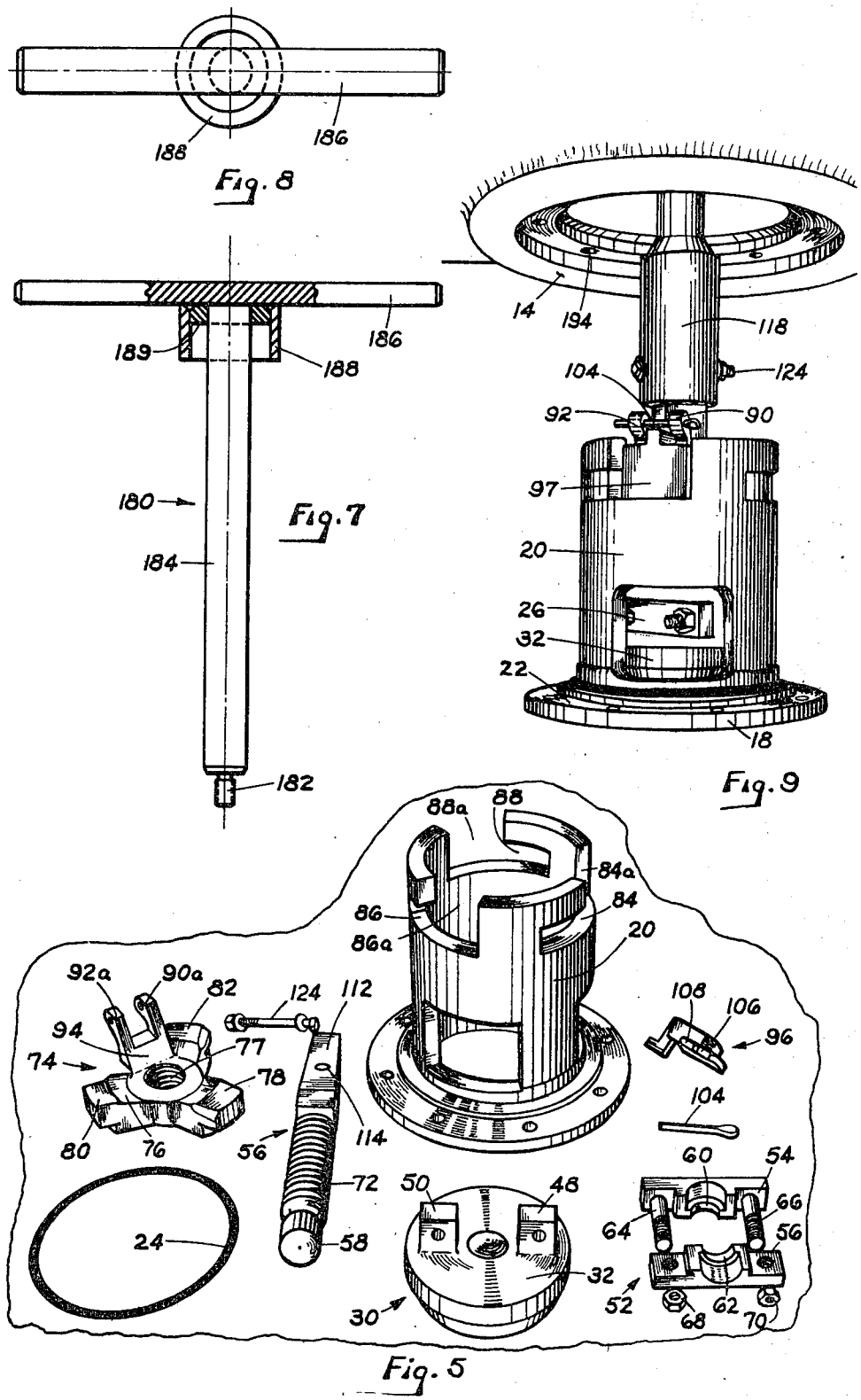

TOP OPERATED TANK CAR BOTTOM OUTLET VALVE ASSEMBLY INSTALLED FROM THE BOTTOM OF THE CAR

BACKGROUND OF THE INVENTION

In U.S. Pat. No. 4,270,729 granted June 2, 1981, a top operated tank car valve assembly is disclosed, including a rod extending downwardly from the top of the tank attached to the valve stem of a lading valve located in the bottom of the tank. The stem engages a horizontally extending threaded valve sleeve provided with a mounting flange which engages a cooperating mounting flange on a valve cage. Vertically extending fasteners engage the upper surface of the sleeve, and extend through the valve cage and engage threaded openings in a tank car bottom outlet mounting flange. The cage includes a valve seat for a valve closure formed on the internal surface of the valve cage. Circumferentially spaced openings are formed in the valve cage for lading flow out of the tank. Laterally spaced projections extend upwardly from the lading valve closure. A valve stem retainer includes a pair of formed retainer clamps which define a cavity or opening. The clamps engage the lower end of the valve stem with a sufficiently tight fit as to substantially reduce horizontal and angular movement of the stem relative to the valve closure. A valve guide depends from the valve closure a sufficiently short distance as to not extend below the tank mounting flange, and thereby a skid is not required in order to comply with AAR and DOT regulations concerning projections extending below the bottom surface of a railway tank car.

While the subassembly of the valve closure, valve stem and valve sleeve can be carried out outside the tank, this subassembly must be placed in the tank from the top. And the fasteners extending vertically within the tank and into the tank bottom which hold the sleeve in engagement with the cage and hold the cage in place within the tank must be installed and removed with the operator inside the tank.

It is unpleasant working within a railway tank car. Furthermore, working inside the tank constitutes a safety hazard.

SUMMARY OF THE INVENTION

The object of the present invention is to provide a top operated tank car bottom outlet valve assembly which can be installed from the bottom of the car so that the operator need not climb into the tank for installation and repair of the valve assembly.

In accordance with the present invention, a tank car valve mounting flange, valve cage and valve seat are provided. The cage is generally cylindrical. The mounting flange extends radially outwardly from the cage. The valve seat is located on an inner surface of the cage. A multiarmed sleeve is threaded onto a threaded valve stem. Clamp fastening means attach a valve closure to a lower portion of the stem.

The sub-assembly of the valve closure, valve stem and sleeve is placed within the valve cage, with the closure resting on the valve seat. The arms of the sleeve extend into cage slots having a generally horizontal portion in the cage. Keeper means are provided to retain the sleeve arms with the cage slots. The cage slots preferably also include a sleeve vertical portion. The keeper means preferably include a sleeve keeper located within the sleeve vertical portion. The keeper means also preferably includes a pair of lugs which extend upwardly and outwardly above the keeper. The keeper is preferably contoured such that it tends to fall only inwardly toward the interior of the cage. A key is then inserted through openings located in the spaced lugs to trap the keeper in the valve cage. The stem is then connected to a top operating rod extending to the top of the tank. The valve assembly is then raised by the top operating rod until the flange engages a tank mounting flange. Valve assembly fasteners are inserted through openings in the valve flange into the mounting flange to hold the assembly in place.

An outlet chamber for loading and/or unloading of the lading is then attached to the valve seat mounting flange conveniently with outlet chamber fasteners located on the same bolt circle as the mounting flange fasteners, and the valve assembly and outlet chamber are ready for operation. If desired the outlet chamber need only be attached at the loading site and at destination.

A bottom installation operator is connected to the top operating rod to lower the top operating rod into a position outside of the tank to receive the bottom outlet valve assembly. The bottom installation operator includes stop means which engage the tank top when the top operating rod extends sufficiently far below the tank bottom. An operating handle, preferably as part of a closure cap, is also connected to the top operating rod to rotate the top operating rod and thus move the valve closure between open and closed positions. This operating handle and closure cap is conveniently connected to a nozzle at the top of the tank which houses the upper end of the valve operating rod.

THE DRAWINGS

FIG. 1 is a vertical sectional view of the top operated bottom outlet assembly of the present invention, looking in the direction of the arrows along the lines 1—1 in FIG. 2 and in FIG. 4.

FIG. 3 is a vertical sectional view of an alternative non-gasketed valve closure of the present invention.

FIG. 5 is an exploded perspective view of the valve elements to be utilized in assembling the cage which is to be attached to the depending top operating rod.

FIG. 6 is a vertical sectional view of the top operating rod and operating handle to be utilized in the present invention.

FIG. 7 is a vertical sectional view of a handle to be attached to the top operating rod of the present invention.

FIG. 8 is a plan view of FIG. 7.

FIG. 9 is a perspective view of the bottom operable valve assembly attached to the top operating rod ready to be raised into position engaging the tank bottom.

DESCRIPTION OF PREFERRED EMBODIMENTS

Figure 2:
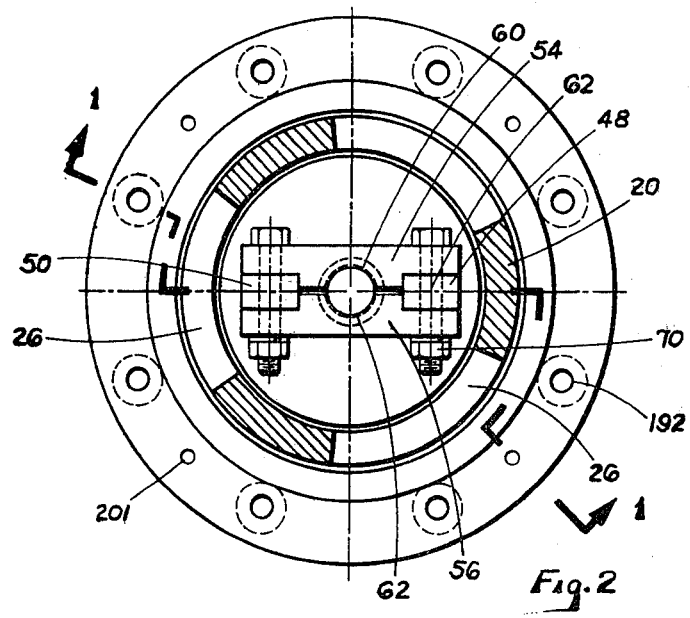
FIG. 2 is a sectional view looking in the direction of the arrows along the line 2—2 in FIG. 1.

In the drawings a railway tank car 10 includes a tank bottom 12 having a tank mounting flange 14. A combination valve mounting flange, valve cage and valve seat indicated generally at 16 is provided. This includes a flange portion 18 extending radially outwardly from a valve cage portion 20. Flange portion 18 includes a step 22. An O ring seal 24 is provided between the mounting flange 14 and the valve flange 18.

Cage portion 20 includes a plurality of openings 26 for lading flow (FIG. 2). A valve seat 28 is provided on the inner surface of flange portion 18.

A valve closure 30 includes a body portion 32 having depending therefrom a stud 34. Stud 34 is threaded and receives a threaded nut 36 which holds a seal retainer 38 in engagement with a circumferential seal 40 located in a slot 42. Slot 42 includes an upper portion 44 and seal 40 on upper portion 45 to prevent loss of seal from the closure, in the event the seal becomes bound to the valve seat 28. A cotter pin 46 extending through stud 34 and nut 36 is used to hold the nut in place. Seal retainer 38 includes a slot 39 to save weight, and a depending valve guide portion 41 to guide movement of closure 30 toward the cage center while closing the valve.

In FIG. 3, a valve closure 30' is not gasketed and includes a body portion 32' having a seat 34' and a depending guide portion 36'. The construction in FIG. 3 is otherwise the same as in FIG. 2.

Valve closure 30 further includes a pair of upwardly extending lugs 48 and 50. A stem clamp assembly 52 (FIG. 5) includes a pair of clamps 54 and 56 which engage either side of lugs 48 and 50. A stem 56 includes a lower circular portion 58 which is located within semi-circular portions 60 and 62 of clamps 54 and 56. Bolts 64 and 66 hold the clamps in engagement with lugs 48 and 50 and semi-circular portions 60 and 62 in engagement with stem circular portion 58. Nuts 68 and 70 hold the bolts in place. It is thus seen that with this sub-assembly the stem 56 is integrally connected to the valve closure 30.

Figure 4:
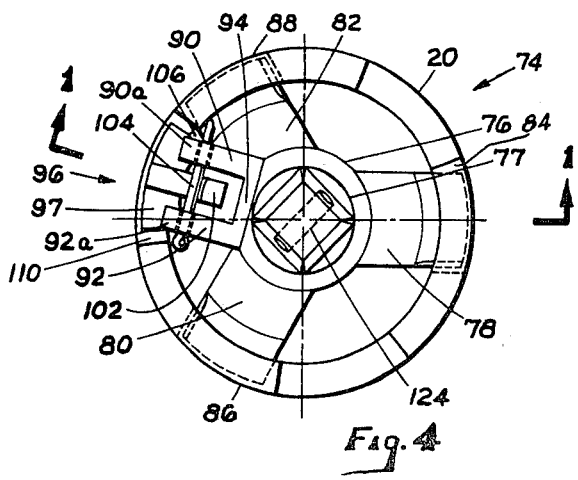
FIG. 4 is a sectional view looking in the direction of the arrows along the line 4—4 in FIG. 1.

Stem 56 further includes a portion of reduced cross section 71 and a threaded body portion 72. A sleeve 74 includes body portion 76 having a threaded opening 77 which is attached to threaded stem portion 72. Sleeve 74 further includes a plurality of radial arm portions 78, 80 and 82. When the assembly of the valve closure stem retainer clamps and stem are inserted into the valve cage portion 20, the arm portions 78, 80 and 82 fit within respective slots 84, 86 and 88 in the valve cage. Slots 84, 86 and 88 include respective vertical portions 84a, 86a and 88a. A pair of lugs 90 and 92 extend upwardly and outwardly from a lug base portion 94 which is integral with sleeve body portion 76. It can be seen from FIG. 4 that the lugs 90 and 92 can thus be located over one of the vertical portions 84a, 86a and 88a of cage slots 84, 86 and 88. In FIG. 4, lugs 90 and 92 are located over vertical slot portion 88a.

A key 96 includes a body portion 97 generally in the form of a partial cylinder and includes a lower step 98 which extends partly down cage wall 20 (FIG. 1). Key 96 further includes an upper radial portion 100 extending inwardly of the cage and an upper extension 102. Lower step 98 and upper extension 102 tend to cause key 96 to move inwardly toward the center of the cage rather than outwardly and out of the cage. However, key 96 is trapped both vertically and laterally by means of a cotter pin 104 which extends through openings 90a and 92a in lugs 90 and 92. Key 96 further includes a lower lug 106 having a tapered surface 108 which is adapted to be engaged by sleeve arm 82 to move the key circumferentially during assembly against the opposite cage wall 110 to secure the key in place. This cage wall would obviously be different depending upon which slot key 96 is inserted into.

Once the valve closure stem 56 and sleeve 74 have been located within the cage 20 with the valve closure 32' (FIG. 3) or seal 40 (FIG. 1) engaging the seat 28, and the sleeve arms 78, 80 and 82, key 96 and cotter 104 in place as shown in FIGS. 1 and 4, the stem can then be connected to a rod extending to the top of the tank. Stem 56 includes a non-round connection portion 112 and an opening 114. An operating rod extending to the top of the tank 116 includes a lower connecting portion 118 having a slot 120 adapted to receive the stem portion 112. It is to be noted that the stem portion is rounded at 122 to provide freedom of movement of the stem relative to the rod connecting portion 118, similar to a universal joint. A pin 124 together with washers 126 and a nut 128 hold the stem portion 112 in engagement with the rod connecting portion 118. See FIGS. 5 and 6.

Rod portion 118 is welded to a connecting member 130 having a rectangular portion 132 and a circular portion 134 which extends within a pipe 136 which extends upwardly toward the top of the tank. A rod 140 includes a lower cylindrical portion 138 which extends within pipe 136. Rod 140 extends into a nozzle 142 attached to the top 144 of the tank. Nozzle 142 includes a cylindrical casing 146 into which is inserted a guide 148 and an elastomeric packing 150. A cap 152 is welded to the lower end of casing 146. An upper threaded cap 154 located at the top of the casing holds this nozzle assembly in place.

An operating handle assembly 156 includes a handle portion 158 and a body portion 160 joined together with gussets or ribs 162. Handle body portion 160 includes a threaded portion 164 which engages a threaded portion 166 of casing 146. Handle body portion 160 is welded to a tubular member 168 and a closure plate 170 is welded to the tube 168 at its upper end. A non-round operating portion 172 is welded to the plate 170.

Rod 140 includes a circular portion 174 extending within packing 150 and guide 148. At the upper end of circular portion 174 a non-round connection portion 176 is provided, for example, by welding or by machining. The connection portion 176 is of smaller cross section than is the handle connection portion 172. Therefore when the handle assembly 156 is removed from the threaded casing 146, the handle connection portion 172 is inserted over the rod connection portion 176 and the valve assembly at the bottom of the tank may be rotated by virtue of the handle assembly 156.

It will be noted that rod connection portion 176 includes a threaded connection slot 178. A bottom installation operator 180 (FIGS. 7 and 8) is provided which is utilized to raise and lower the valve assembly in the bottom of the tank during installation or removal of the valve assembly from the bottom of the tank. This handle assembly includes a non-round projection 182 which extends within the slot 178 in the rod portion 174. A circular body portion 184 extends upwardly from projection 182 and, at its opposite end, an operating handle portion 186 is provided. This operating handle includes a cylindrical skirt 188 and a reinforcing cylinder 189 welded to handle portion 186 and to the skirt. The skirt functions as a stop which engages the top of the tank at the lowermost point to which the rod can descend below the tank (FIG. 9) for attachment to the stem.

In operation, in order to install the bottom operable valve assembly of the present invention, the handle assembly 156 is first removed from nozzle 142 by manual rotation. The handle assembly 180 is then connected to the exposed rod 174 with connection portion 182 threaded into threaded connection slot 178. The operator then lowers operating rod 116 to the lowest extent possible, until stop skirt 188 engages casing top 147. At this point, rod portion 118 is extending below the bottom flange 14 as shown in FIG. 9. With the bottom operable valve assembly assembled as shown in FIGS. 1 and 9, and described above, the stem portion 112 is extended into the slot 120 of rod portion 118 and the pin 124, washers 126 and nut 128 attached, as shown in FIG. 5. If there is an operator on the top of the tank, this operator then raises the connected assembly upwardly until the flange portion 18 engages the tank bottom mounting flange 14. The upper operating portion 174 will readily slide through the guide 148. It is possible for a single operator to raise the valve assembly from the bottom because the assembly and rod only weigh 70–80 pounds. When the flange portion 18 engages the tank mounting flange 14, counter-sunk valve assembly fasteners 190 are then inserted from the bottom into openings 192 in the valve flange, and openings 194 in the tank bottom mounting flange. It is thus seen that the valve assembly of the present invention is installable from outside the tank from the bottom, and the operator need not enter the tank to install this assembly. Thus the undesirable situation of the operator working inside the tank and the safety hazard of the operator working inside the tank is avoided both for initial installation and for repairs and/or retrofit.

An outlet chamber 196 having a flange portion 198 is then attached to flange portion 18 with fasteners 200 extending into openings 201 preferably located on the same bolt circle as fasteners 190. Fasteners 200 are of the type which will shear off upon hard impact to the outlet chamber 196. Thus it is not necessary to provide a skid for this assembly as required in certain AAR and DOT regulations concerning projections of the tank bottom in excess of one (1) inch. A threaded cap 198 closes on opening 199 in the bottom of the outlet chamber. The lading is removed from the tank by means of a suitable discharge conduit (not shown) connected to the outlet chamber 196 in a known manner. Valve closure 32 or 32' is moved between open and closed position by rotation of handle assembly 156 with handle connection portion 172 engaging operating rod connection portion 176.

It is to be emphasized that the unloading spout 196 may be attached at the loading site and at destination only, or it may remain in place in transit. Since it has been found that the closure 32, 32' has sometimes been left open by operator in the field when the outlet chamber is in place and the outlet chamber cap relied on to hold the lading within the tank, if the outlet chamber is not on the car at all, the operator must ensure that the valve closure assumes the seated position engaging the valve seat 28 prior to loading. Otherwise the lading will run out of the tank. If the closure is left open with the outlet chamber in the car and the outlet chamber is sheared off, there is a danger that lading from the tank will spill causing danger to persons and property. Thus, some shippers may elect to leave the outlet chamber off and attach the same at the loading site and at destination.

What is claimed is:

1. A top operated tank bottom outlet valve assembly which can be installed from the bottom of the tank comprising: a tank having a bottom opening; a tank mounting flange located within said bottom opening and having a mounting flange opening; a generally vertical extending valve cage extending into said tank through said mounting flange opening and having a horizontal cross section throughout its extent into the tank of smaller dimensions than said mounting flange opening; said cage having spaced openings for lading flow into the cage; a cage mounting flange extending outwardly from said cage; a valve seat located within said cage; a vertically extending threaded valve stem located within said cage; closure fastening means attaching a valve closure to a lower portion of the stem; said valve closure and said valve stem located within said cage with said closure resting on said valve seat; threaded sleeve means connected to said stem and extending outwardly toward and engaging said cage; removable keeper means retaining said sleeve means in engagement with said cage and preventing said sleeve from rotating during rotation of said stem; said stem connected to top operating rod means extending upwardly to the top of the tank whereby said valve assembly may be raised from below said tank until said cage mounting flange engages said tank mounting flange; removable valve assembly fastening means attachable from the bottom maintaining said cage mounting flange in engagement with said tank mounting flange and holding said cage in place within the tank; said cage, said closure, said valve stem, said sleeve means and said keeper being removable from the bottom by removal of said valve assembly fastening means.

2. A top operated valve assembly according to claim 1 including an outlet chamber for loading and/or unloading of the lading attached to said cage mounting flange with outlet chamber fasteners.

3. A top operated tank bottom outlet valve assembly which can be installed from the bottom of the tank comprising: a tank having a bottom opening; a tank mounting flange located within said bottom opening and having a mounting flange opening; a generally vertical extending valve cage extending into said tank through said mounting flange opening and having a horizontal cross section throughout its extent into the tank of smaller dimensions than said mounting flange opening; said cage having spaced openings for lading flow into the cage; a cage mounting flange extending outwardly from said cage; a valve seat located within said cage; a vertically extending threaded valve stem located within said cage; closure fastening means attaching a valve closure to a lower portion of the stem; said valve closure and said valve stem located within said cage with said closure resting on said valve seat; threaded sleeve means engaging said threaded stem and extending outwardly from a sleeve body portion into at least one cage slot; removable keeper means for retaining said sleeve means within said cage slot and preventing rotation of said sleeve means during rotation of said stem; said stem removably connected to a top operating rod extending upwardly to the top of the tank; whereby said valve assembly may be raised by said top rod until said cage mounting flange engages said tank mounting flange surrounding said bottom opening; valve assembly fasteners extending through openings in said cage mounting flange into said tank mounting flange to hold said valve assembly in place; said cage, said closure, said valve stem, said sleeve means and said keeper being removable from the bottom by removal of said valve assembly fastening means.

4. A top operated valve assembly according to claim 3 including an outlet chamber for loading and/or unloading of the lading attached to said cage mounting flange with outlet chamber fasteners.

5. A top operated valve assembly according to claim 4 wherein said outlet chamber fasteners are located on the same bolt circle as said valve assembly fasteners.

6. A top operated valve assembly according to claim 5 wherein said cage slot includes a cage vertical portion and wherein said keeper means includes a keeper located within said cage vertical portion.

7. A top operated valve assembly according to claim 6 wherein said keeper is contoured such that it tends to fall only inwardly toward the interior of the cage.

8. A top operated valve assembly according to claim 7 wherein said sleeve further includes a pair of lugs which extend upwardly and outwardly from said sleeve body portion beyond said keeper.

9. A top operated valve assembly according to claim 8 wherein said keeper means further includes a key extending through openings located in the spaced lugs to trap said keeper in said valve cage.

10. A top operated valve assembly according to claim 9 wherein said keeper means includes an upper radial portion having an upper extension inboard of said key which extends at least as high as said key whereby said keeper is trapped.

11. A top operated tank car bottom outlet valve assembly which can be installed from the bottom of the car according to claim 3 wherein said top operating rod includes a top operating rod connection portion at its upper end; a bottom installation operator having a handle portion and a connection portion engaging said top operating rod connection portion to lower said top operating rod to a position through said mounting flange opening, and then raise said cage until said cage mounting flange abuts said tank mounting flange.

12. A top operated tank car bottom outlet valve assembly according to claim 11 wherein said top operating rod connection portion is a threaded slot and wherein said bottom installation operator connection portion is a threaded projection.

13. A top operated tank car bottom outlet valve assembly according to claim 11 wherein said bottom installation operator includes stop means which engage when said top operating rod extends sufficiently far below the tank bottom.

14. A top operated tank car bottom outlet valve assembly according to claim 13 wherein said stop means comprise a stop depending from said handle portion.

15. A top operated tank car bottom outlet valve assembly according to claim 14 wherein said stop comprises a cylindrical skirt depending from said handle portion.

16. A top operated tank car bottom outlet valve assembly according to claim 11 including an operating handle assembly adapted to engage said top operating rod and rotate said top operating rod and thus move said valve closure between open and closed positions.

17. A top operated tank car bottom outlet valve assembly according to claim 16 wherein said operating handle includes an operating handle non-round portion which engages a non-round top operating rod portion.

18. A top operated tank car bottom outlet valve assembly according to claim 17 wherein said operating handle non-round portion includes a threaded slot to receive said bottom installation operator.

19. A top operated tank car bottom outlet valve assembly according to claim 16 wherein said operating handle is connected to a nozzle extending upwardly from the top of the tank.

20. A top operated tank car bottom outlet valve assembly according to claim 16 wherein said operating handle is connected to a nozzle with a threaded fitting.

21. A top operated tank car bottom outlet valve assembly according to claim 16 wherein said handle further comprises a cap for said top operating rod.

22. A method of installing a top operated tank car bottom outlet valve assembly from the bottom of the tank comprising: attaching a tank mounting flange having a mounting flange opening into a tank bottom opening; extending a vertically extending tank car valve cage into said mounting flange opening; said cage having transverse dimensions smaller than said mounting flange opening and having circumferentially spaced openings for lading flow into the cage; attaching an outwardly extending cage flange to said valve cage; forming a valve seat within said cage; attaching a threaded multi-armed sleeve means onto a threaded vertically extending valve stem; attaching a valve closure to a lower portion of the stem with closure fastening means; placing a subassembly of the valve closure, valve stem and sleeve within the valve cage, with the closure resting on the valve seat; locating the arms of the sleeve adjacent said cage; attaching removable keeper means to said sleeve means to maintain said arms in engagement with said cage, and prevent said sleeve from rotating during rotation of said stem; connecting the stem to a top operating rod extending to the top of the tank; raising the assembled cage and top rod until said cage mounting flange engages said tank mounting flange; and attaching removable valve assembly fasteners to hold said cage mounting flange and said tank mounting flange in engagement and said cage in place within the tank.

23. A method of installing a valve assembly according to claim 22 including attaching an outlet chamber for loading and/or unloading of the lading to said cage mounting flange with outlet chamber fasteners.

24. A method of installing a valve assembly according to claim 23 including attaching the outlet chamber fasteners on the same bolt circle as said valve assembly fasteners.

25. A method of installing a valve assembly according to claim 23 wherein the outlet chamber is only attached at the loading site and at destination and is removed during transit.

* * * * *